(12) United States Patent
Hyun et al.

(10) Patent No.: US 10,254,932 B2
(45) Date of Patent: Apr. 9, 2019

(54) METHOD AND APPARATUS OF SELECTING ITEM OF PORTABLE TERMINAL

(71) Applicant: Samsung Electronics Co., Ltd., Gyeonggi-do (KR)

(72) Inventors: Junho Hyun, Gyeonggi-do (KR); Youngkyoo Kim, Seoul (KR); Dongho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 218 days.

(21) Appl. No.: 14/269,855

(22) Filed: May 5, 2014

(65) Prior Publication Data
US 2014/0331170 A1 Nov. 6, 2014

(30) Foreign Application Priority Data

May 3, 2013 (KR) .......................... 10-2013-0050268

(51) Int. Cl.
| | | |
|---|---|---|
| *G06F 3/048* | (2013.01) | |
| *G06F 3/0484* | (2013.01) | |
| *G06F 3/0482* | (2013.01) | |
| *G06F 3/0485* | (2013.01) | |
| *G06F 3/0488* | (2013.01) | |

(52) U.S. Cl.
CPC ........ *G06F 3/04842* (2013.01); *G06F 3/0482* (2013.01); *G06F 3/0485* (2013.01); *G06F 3/04883* (2013.01)

(58) Field of Classification Search
CPC ..................................................... G06F 3/048
See application file for complete search history.

(56) References Cited

U.S. PATENT DOCUMENTS

| | | | | |
|---|---|---|---|---|
| 6,147,683 | A * | 11/2000 | Martinez ............. | G06F 3/04855 715/786 |
| 7,685,209 | B1 * | 3/2010 | Norton .............. | G06F 17/30997 707/803 |
| 2005/0166159 | A1 * | 7/2005 | Mondry ................ | G06F 3/0486 715/769 |
| 2009/0210810 | A1 | 8/2009 | Ryu et al. | |
| 2010/0039399 | A1 * | 2/2010 | Kim ....................... | G06F 3/0482 345/173 |
| 2011/0083105 | A1 * | 4/2011 | Shin ........................ | G06F 17/24 715/830 |
| 2011/0161853 | A1 * | 6/2011 | Park ....................... | G06F 3/0486 715/769 |
| 2012/0147057 | A1 | 6/2012 | Lee | |

(Continued)

FOREIGN PATENT DOCUMENTS

| | | |
|---|---|---|
| KR | 0504841 B1 | 7/2005 |
| KR | 2009-0088597 A | 8/2009 |
| KR | 2012-064752 A | 6/2012 |

*Primary Examiner* — Xuyang Xia
(74) *Attorney, Agent, or Firm* — The Farrell Law Firm, P.C.

(57) ABSTRACT

An item selection method and an item selection apparatus of a portable terminal are provided. The item selection method in the portable terminal includes displaying one or more items in an arrangement according to a prescribed rule; receiving a start item setting input that sets a first item as a start item; receiving an end item setting input that sets a second item as an end item; and setting items included between the first item and the second item as selected items.

12 Claims, 10 Drawing Sheets

(56) References Cited

U.S. PATENT DOCUMENTS

2013/0173397 A1\* 7/2013 Nations ................ G06F 3/0482
705/14.73
2013/0235088 A1\* 9/2013 Miura ...................... G09G 5/34
345/684

\* cited by examiner

METHOD AND APPARATUS OF SELECTING ITEM OF PORTABLE TERMINAL

PRIORITY

This application claims priority under 35 U.S.C. § 119(a) to Korean Patent Application Serial No. 10-2013-0050268, filed in the Korean Intellectual Property Office on May 3, 2013, the entire content of which is incorporated herein by reference.

BACKGROUND

1. Field of the Invention

The present invention relates generally to a method and an apparatus of selecting an item of a portable terminal, and more particularly, to a method and an apparatus of selecting a plurality of items among items which are arranged one-dimensionally or two-dimensionally.

2. Description of the Prior Art

Recently, portable terminals are being developed into multimedia devices such as a smart phone that allow various supplementary services, such as a digital organizer function, a game function, a schedule management function, etc., to be provided. As portable terminals provide various supplementary services as described above, a user interface (UI) is essential to manage and use the various kinds of supplementary services more conveniently.

There are a plurality of applications that show specific items such as music, photographs, moving images, e-mail, etc. in a list form using a smart phone in which, after directly selecting a plurality of files in a corresponding list, a user executes various functions such as deletion, movement, transmission, sharing, etc.

Figure 1A:
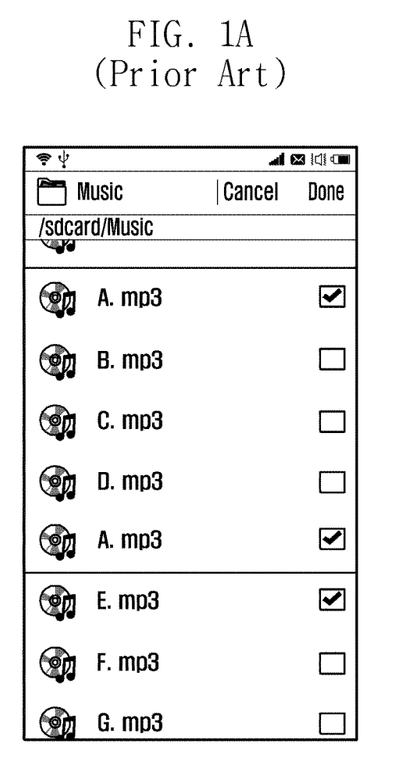
FIGS. 1A-1C illustrate a method of selecting a plurality of items according to the prior art.
Figure 1B:
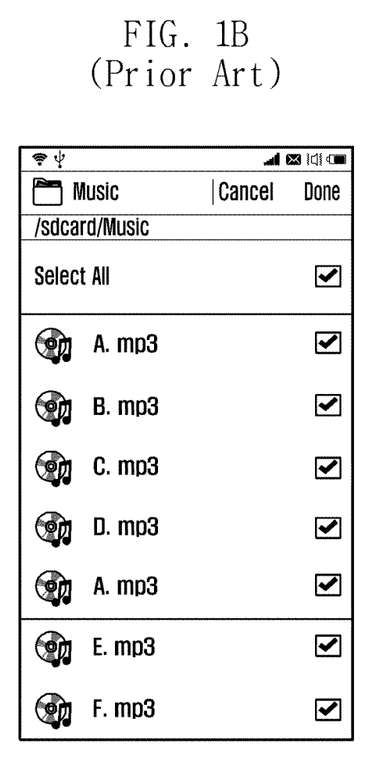
Figure 1C:
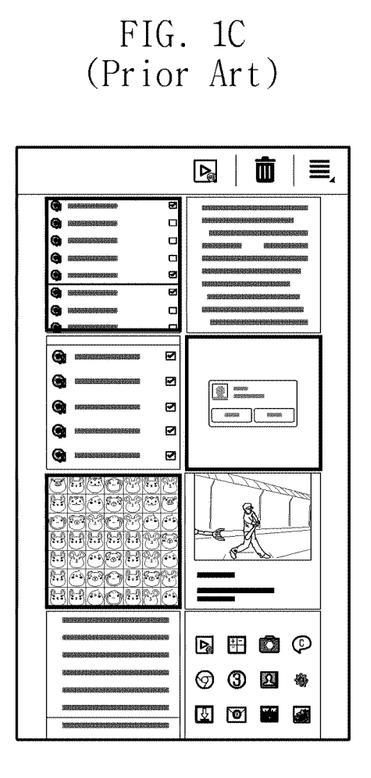

In such a case, when it is desired to select or cancel a plurality of files from an application (file explorer, gallery or the like) that shows various files existing in the portable terminal, it is necessary to directly select or cancel individual items as illustrated in FIG. 1A (list form) or FIG. 1C (grid form), or select or cancel all the files at once as illustrated in FIG. 1B.

A conventional method of selecting a plurality of list items in the UI appearing in a list form, as described, is to select individual list items one by one, or to select all the list items through an overall selection option and then cancel unnecessary list items to perform selection.

When the list items are selected using the conventional method, as described above, it is not very inconvenient when the number of overall list items is small. However, it is easy to encounter a case where a plurality of files are to be transmitted or applications have a number of list items in a smart device equipped with a high-performance processor and a high-capacity memory. In such a case, the following problems may be encountered.

First, when there are many list items and many of them are selected, it is necessary to select each of the items individually. For example, when there is a list that shows 200 files and it is desired to select 100 files, there is an inconvenience in that a user must directly select 100 list items to be selected unconditionally.

Second, there is a problem in that it is not possible to confirm how many list items have been selected up to now in the overall list, and which files have been selected.

SUMMARY

The present invention has been made to address at least the problems and disadvantages described above, and to provide at least the advantages described below.

Accordingly, an aspect of the present invention is to provide a method and an apparatus of selecting a plurality of items among items arranged one-dimensionally or two-dimensionally.

Another aspect of the present invention is to provide a method and an apparatus for a section selection function, a function of separately showing selected items, etc. so that the user may rapidly select or cancel items desired by the user.

In accordance with an aspect of the present invention, there is provided an item selection method of a portable terminal. The item selection method includes displaying one or more items in an arrangement according to a prescribed rule; receiving a start item setting input that sets a first item as a start item; receiving an end item setting input that sets a second item as an end item; and setting items included between the first item and the second item as selected items.

In accordance with another aspect of the present invention, a portable terminal for selecting an item is provided. The portable terminal includes an input unit that receives a selection input; a display unit that displays one or more items; and a control unit that arranges the one or more items for display in an arrangement according to a prescribed rule, receives a start item setting input for setting a first item as a start item, receives an end item setting input for setting a second item as an end item, and sets items included between the first item and the second item as selected items.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to accompanying drawings. At this time, in the accompanying drawings, like elements will be denoted by like reference numerals. In addition, a detailed description on a well-known function and configuration will be omitted when it may make the gist of the present invention unclear.

An "item" in the present invention refers to a unit used for identifying or executing an application, a folder, a widget, a file, etc. In such a case, the item be displayed as a shape, a pattern, a color, or a combination thereof.

In an embodiment of the present invention, items may be arranged vertically in a one-dimension form. In addition, in another embodiment of the present invention, the items may be arranged in a grid form of vertical and horizontal directions in a two-dimensional form.

A first embodiment of the present invention is related to a method of individually selecting items, specifically selecting items desired to be selected among items displayed in a list or grid form. According to the first embodiment, the selected items are displayed to be fixed to an end portion of a scroll occurring direction such that the selected items do not leave the screen. In addition, according to the first embodiment, when a region that displays the selected items in the item selection process becomes larger than a predetermined size, the selected items are displayed in a state where item information is reduced. For this purpose, an indicator is introduced, which will be described below in detail. The indicator may be applied to all the embodiments of the present invention.

A second embodiment of the present invention is a section selection method that includes selecting a start item that serves as a section start reference and an end item that serves as a section end reference. According to the second embodiment, the start item is displayed to be fixed at an end portion of a scroll occurring direction such that the start item does not leave the screen while items are selected through the section selection even if scrolling occurs. In addition, according to the second embodiment, information for the items selected through the section selection is displayed in a specific region of the screen.

A third embodiment of the present invention relates to a grid selection method in which a plurality of items is selected by an individual selection or section selection method in a state where items are displayed in a grid form. According to the third embodiment, the selected items are added to and displayed in a predetermined region of the screen. When all the selected items cannot be displayed in the predetermined region, the items are displayed in a state where item information is reduced.

Hereinafter, each of the embodiments will be described in detail with reference to accompanying drawings.

Figure 2:
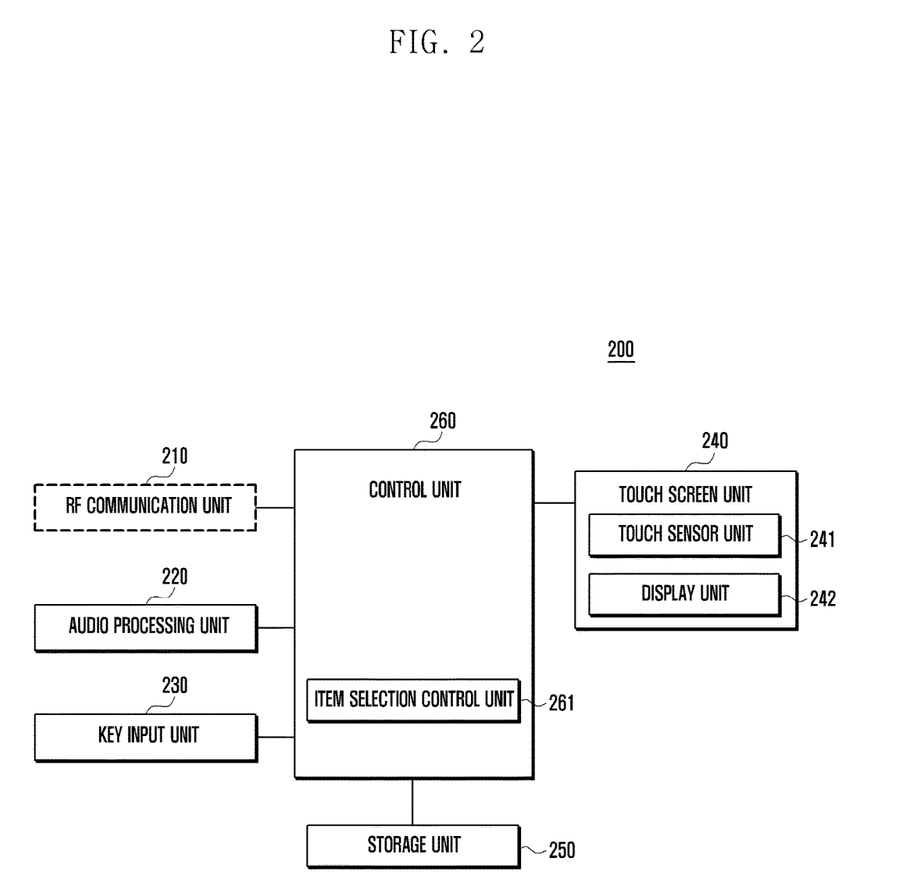
FIG. 2 is a block diagram illustrating a portable terminal according to an embodiment of the present invention.

FIG. 2 is a block diagram that illustrates a portable terminal according to an embodiment of the present invention.

Referring to FIG. 2, the portable terminal 200 of the present invention include an RF communication unit 210, an audio processing unit 220, a key input unit 230, a touch screen unit 240, a storage unit 250, and a control unit 260.

The RF communication unit 210 conducts a transmission/reception function of corresponding data for wireless communication of the portable terminal 200. The RF communication unit 210 consists of an RF transmitter that up-converts and amplifies a frequency of a transmitted signal and an RF receiver that low-noise-amplifies and down-converts a frequency of a received signal. In addition, the RF communication unit 210 receives data through a wireless channel and outputs the data to the control unit 260 and transmits data output from the control unit 260 through the wireless channel.

The RF communication unit 210 is illustrated by dotted lines on the drawing because the portable terminal according to the embodiment of the present invention does not necessarily have to be provided with the RF communication unit 210. In other words, when the portable terminal of the present invention is a device such as an MP3 player or a digital organizer, the RF communication unit 210 does not necessarily have to be provided.

The audio processing unit 220 consists of a CODEC and the CODEC is configured with a data CODEC that processes packet data or the like and an audio CODEC that processes an audio signal. The audio processing unit 220 converts a digital audio signal into an analog audio signal through the audio CODEC and reproduces the analog audio signal through a speaker SPK. In addition, the audio processing unit 220 converts an analog signal input from a microphone MIC into a digital audio signal through the audio CODEC.

The key input unit 230 (or an input unit) receives an input of a user's key operation for controlling the portable terminal 200 and generates and transmits an input signal to the control unit 260. The key input unit 230 consists of a keypad that includes number keys and a direction key and is formed by predetermined keys on a surface of the portable terminal 200. When the portable device, according to the embodiment of the present invention, is a portable terminal in which all the operations may be performed only using the touch screen unit 240, the key input unit 230 may be omitted.

The touch screen unit 240 includes a touch sensor unit 241 and a display unit 242.

The touch sensor unit 241 senses the user's touch input. The touch sensor unit 241 consists of a touch sensor such as a capacitive overlay touch sensor, a resistive overlay touch sensor, or an infrared beam touch sensor, or consists of a pressure sensor. Besides the above-mentioned sensors, all the types of sensor devices capable of sensing a contact of an object or a pressure may be included with a touch sensor unit 241 of the present invention. The touch sensor unit 241 senses the user's touch input and generates and transmits a sensing signal to a control unit 260. The sensing signal includes coordinate data related to the touch input of the user. When the user inputs a touch position moving gesture, the touch sensor unit 241 generates and transmits a sensing signal including coordinate data of the touch position moving path to the control unit 260. The touch sensor unit 241, additionally senses the user's input for selecting a plurality of items according to an embodiment of the present invention. The user's input include a sweep, a drag, a tap, a double tap, a long tap, a press, a long press, a gesture to space multiple contact points apart from each other, etc.

The sweep and the flick are similar in concept and refer to an operation of rapidly moving a touch input mean as if bouncing off the screen and then releasing the touch. The drag refers to an operation of moving a touch means in a direction in a state where the touch means touches any one point, and the tap refers to an operation of touching a point and then releasing the touch from the corresponding point without movement. The double tap refers to an operation of continuously repeating the tap operation twice in which, when the second input is the tap, the control unit 140 recognizes the tap gesture as the double tap. The long tap refers to an operation of holding a touch for a pre-set length of time or more and then releasing the touch from the corresponding point without moving the touch input means. The press is an operation of applying pressure to a point on the screen using a touch input means. The long press refers to an operation of holding the press operation for a pre-set length of time or more.

The display unit 242 may be formed using a Liquid Crystal Display (LCD), an Organic Light Emitting Diodes (OLED), an Active Matrix Organic Light Emitting Diodes (AMOLED), etc. and visually provides the user with a menu, input data, function setting information, and other various information of the portable terminal 200. The display unit 242 performs a function of outputting a booting screen, a standby screen, a menu screen, a communication screen, and other applications of the portable terminal 200.

It shall be noted that, although the portable terminal 200 of an embodiment of the present invention may be configured to include a touch screen as described above, the embodiments of the present invention are not limited to. When an embodiment of the present invention is applied to a portable terminal that does not include a touch screen, the touch screen unit 240 may be modified and applied to perform only the function of the display unit 242.

The storage unit 250 stores programs and data required for the operation of the portable terminal 100 and is divided into a program region and a data region. The program region stores a program for controlling the entire operation of the portable terminal 200, an Operating System (OS) for booting the portable terminal 200, an application program required for reproducing multimedia contents, etc., an application program required for other optional functions of the portable terminal 200, for example, a camera function, a sound reproducing function, a image or video reproducing function, etc. The data region is a region in which data generated when the portable terminal 100 is used is stored. For example, an image, a video, a phone book, audio data, etc. may be stored.

The control unit 260 controls the entire operation of respective constituent elements of the portable terminal. Specifically, the control unit 260 controls a series of steps for selecting a plurality of items among items arranged in a one-dimensional form or a two or more-dimensional form. For this purpose, the control unit 260 further includes an item selection control unit 261.

The item selection control unit 261 arranges the plurality of items according to a prescribed rule. In addition, the item selection control unit 261 receives a start item setting input for setting a first item as a start item and an end item setting input for setting a second item as an end item. Further, the item selection control unit 261 performs a control in such a manner that the items included between the first item and the second item are set as selected items.

In addition, the item selection control unit 261 performs a control in such a manner that the selection item display region is displayed and the selected items are displayed in the selection item display region. The item selection control unit 261 performs a control such that only a pre-set number of items among the selected items are displayed in the selection item display region. Further, the item selection control unit 261 performs a control such that an indicator corresponding to the number of the selected items is displayed in the selection item display region. In such a case, the indicator is set to indicate a value corresponding to the number of selected items minus the number of currently displayed items.

Upon sensing a selection input for the selection item display region, the item selection control unit 261 displays the selection item cancel region including the selected items. Then, upon receiving a user selection input for an item among the selected items displayed in the selection item cancel region, the item selection control unit 261 performs a control such that the user selection for the item for which the user selection input is received is canceled.

According to another embodiment of the present invention, when conducting scrolling according to a scroll command received after receiving the start item setting input, the item selection control unit 261 determines whether the start item according to the start item setting input leaves the display screen of the portable terminal. When the start item leaves the display screen, the item selection control unit 261 performs a control in such a manner that the start item is fixed to and displayed in a region of the display screen according to the scroll direction.

In addition, according to another embodiment of the present invention, in a case where the plurality items are arranged in the grid form, when conducting scrolling according to a scroll command received after receiving the start item setting input, the item selection control unit 261 determines whether the start item leaves the display screen of the portable terminal. When it is determined that the start item leaves the display screen, the item selection control unit 261 performs a control such that the start item is displayed in the selection item display region.

In the foregoing, it has been described that the control unit 260 and the item selection control unit 261 are configured as separate blocks and that the blocks perform different functions. However, this is only for the convenience of description and the respective functions are not necessarily differentiated. For example, it shall be noted that a specific function performed by the item selection control unit 261 may also be performed by the control unit 260 itself.

FIGS. 3A-3H illustrate a method of individually selecting a plurality of items according to an embodiment of the present invention.

Referring to FIGS. 3A-3H, descriptions will be made on a method of individually selecting a plurality of items according to an embodiment of the present invention.

Figure 3A:
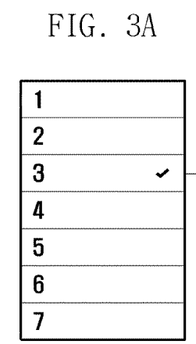
FIGS. 3A-3H are views illustrating a method of individually selecting a plurality of items according to an embodiment of the present invention.

FIG. 3A illustrates a state where a plurality of items are displayed (arranged) in a list form. That is, the plurality of items are arranged one-dimensionally in a vertical or horizontal direction. FIG. 3A illustrates an embodiment of the present invention in which the plurality of items are displayed in the vertical direction.

As shown in FIG. 3A, the user's selection input that selects a file may be received. The user's selection input includes, for example, a touch, a sweep, a drag, a tap, a double tap, a long tap, a press, a long press (or press and hold), or a gesture that causes multiple contact points to be spaced apart from each other. In the embodiment of the present invention described herein, the user's selection command is preferably a touch input.

Figure 3B:
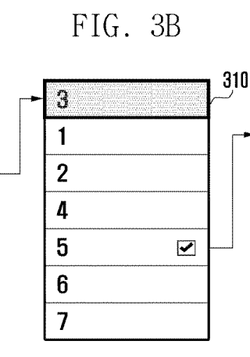

FIG. 3B illustrates a state in which, when selection for an item (the $3^{rd}$ item) is input, a first region (the selection item display region 310) for displaying the selected item is displayed at a part of the screen, preferably, at the top portion and the selected item is displayed in the selection item display region 310. According to an embodiment of the present invention, the selection item display region 310 uses a specific focus or is highlighted so as to indicate that the file displayed in the corresponding region is the file selected by the user.

FIG. 3B further illustrates that the $5^{th}$ item is selected following the selection of the $3^{rd}$ item.

Figure 3C:
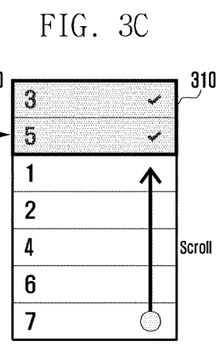

FIG. 3C illustrates a state in which, when the $5^{th}$ item is selected, the selected $5^{th}$ item is then displayed after the $3^{rd}$ item in the selection item display region 310. In FIG. 3C, the selection item display region 310 is expanded downward in order to additionally display the 5th item. Similarly, the selection item display region 310 uses a specific focus or is highlighted to indicate that the file displayed in the corresponding region is the file selected by the user.

FIG. 3C further illustrates that a scroll command is input after the item selection was input.

Figure 3D:
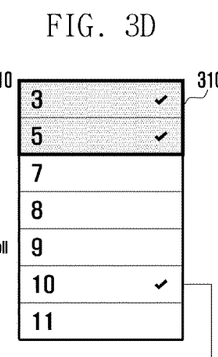

As shown in FIG. 3C, when the selection item display region 310 is displayed at the top side of the display screen, the selection item display region 310 is fixed in place such that it is excluded from the scrolling as shown in FIG. 3D. Therefore, if the list is scrolled, the selected files may always be displayed.

In addition, FIG. 3D illustrates that another item (the 10th item) is selected by the user. When the maximum number of items displayable in the selection item display region 310 exceeds a given threshold, newly selected items cannot be displayed in the selection item display region 310. For example when the maximum number of items displayable in the selection item display region 310 is set as two, the newly selected 10th item cannot be displayed in the selection item display region 310 because the 3rd and 5th items are already displayed in the selection item display region 310.

Figure 3E:
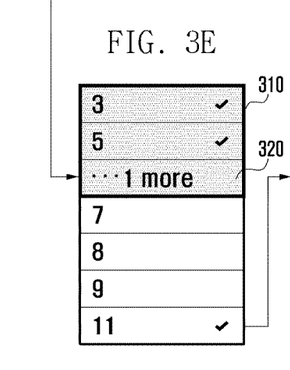

In such a case, in the embodiment of the present invention, an indicator 320 is displayed in the selection item display region 310 as illustrated in FIG. 3E. The indicator 320 indicates a value corresponding to the number of items selected by the user minus the number of items currently displayed in the selection item display region 310.

In the embodiment, although the user selects three items (the 3rd, 4th and 10th items), two items are currently displayed in the selection item display region 310. Thus, the indicator 320 is set to 1 to indicate that there is 1 more selected item which is not displayed in the selection item display region 310.

In addition, FIG. 3E illustrates that the 11th item is selected.

In this case, similarly, the selected 11th item cannot be displayed in the selection item display region 310. As a result, the indicator 320 of the selection item display region 310 is set to 2 to indicate that there are 2 more selected item which are not displayed in the selection item display region 310, as shown in FIG. 3F.

Figure 3F:
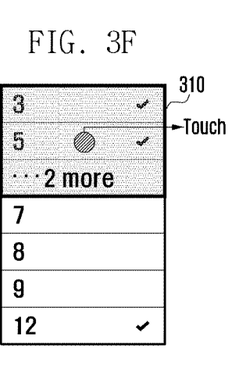
Figure 3G:
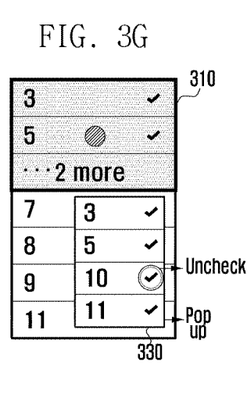

FIG. 3F further illustrates that the user's input that selects the selection item display region 310 is received. When the user's input that selects the selection item display region 310 is received, a second region (a selection item cancel region 330) is displayed as illustrated in FIG. 3G The selection item cancel region 330 displays items selected by the user until the selection input for the selection item display region is received. Preferably, the selection item cancel region 330 is displayed in a pop up form and a check box is displayed at a side of the selected items to indicate that the corresponding items are selected by the user.

The items displayed in the selection item cancel region 330 may be arranged one-dimensionally in the vertical or horizontal direction or in a two-dimensional grid form. Further, when the items selected by the user cannot be all displayed in the selection item cancel region 330, only the set number of items are displayed in a fixed state and then the remaining items be displayed through a scroll input.

When the user's selection input for an item among the items displayed in the selection item cancel region 330 is received, the selection for the corresponding item for which the user's selection input is received is cancelled. In such a case, the check mark of the check box displayed at a side of the corresponding item is removed.

Figure 3H:
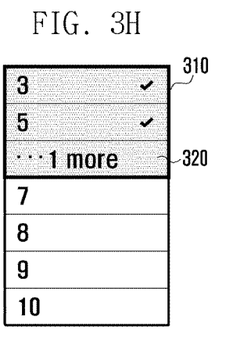

The item for which the selection has been cancelled by the user is removed from the selection item display region 310 as shown in FIG. 3H and the item is returned to and displayed in its original position on the original list. At the same time, the indicator 320 is displayed in a state where the number of items for which the selection has been cancelled by the user is reflected. In the examples provided in FIGS. 3A-3H, when the user has cancelled selection for one item (the 10th item, for example), the indicator 320 is displayed after being changed from 2 to 1 to indicate that there is 1 more selected item which is not displayed in the selection item display region 310. This is because after the cancellation of the 10th item, the currently selected items are the 3rd, 5th and 11th items, with two items (the 3rd and 5th items) being displayed in the selection item display region 310 and the 11th item not displayed.

Figure 4A:
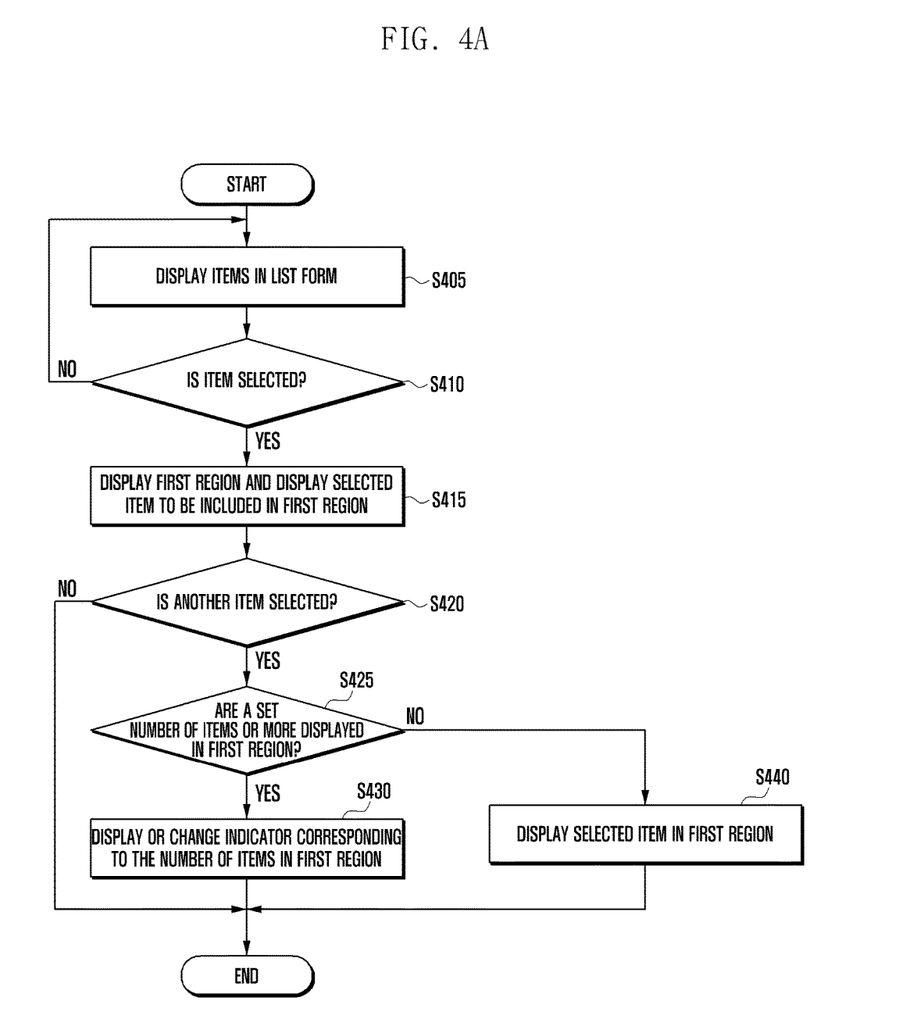
FIGS. 4A-4B are flowcharts illustrating an individual item selection process and an individual item cancellation process according to an embodiment of the present invention.
Figure 4B:
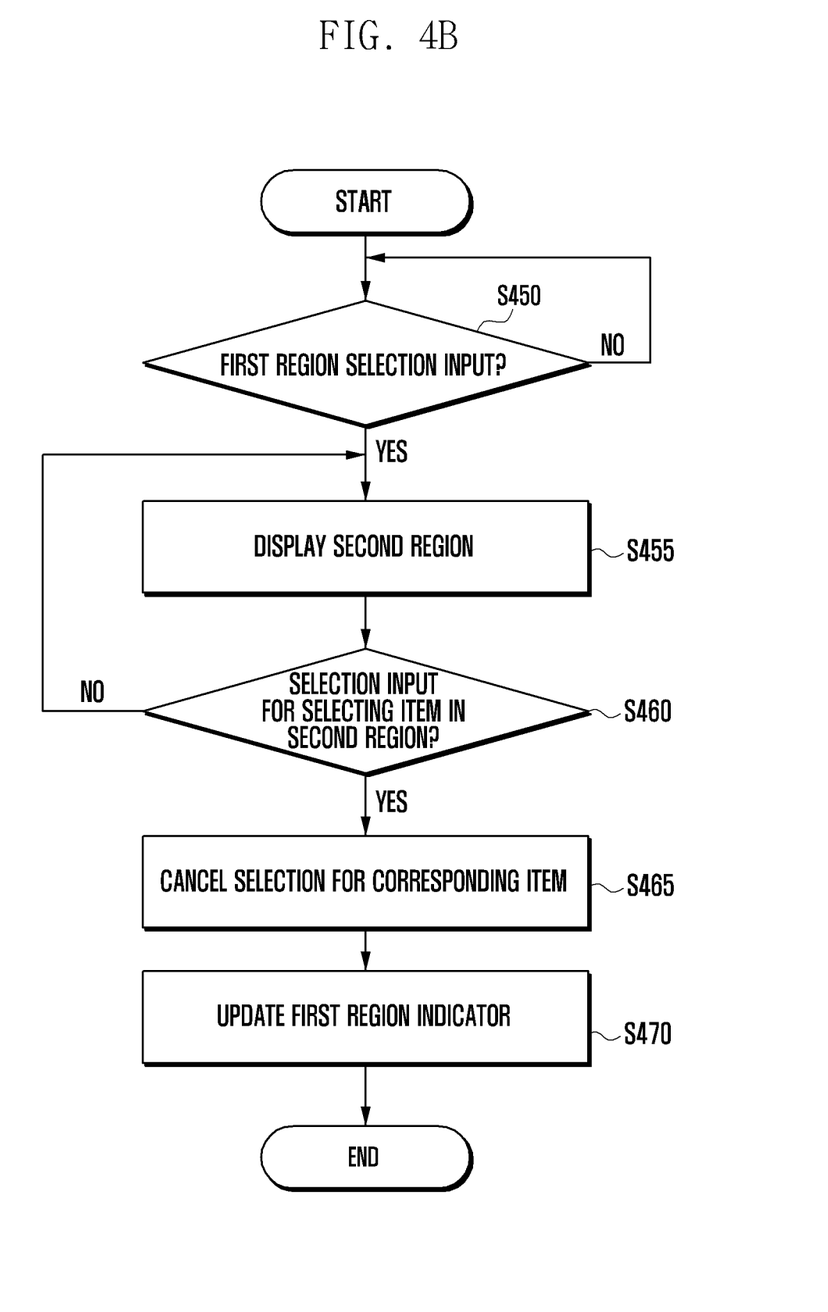

FIGS. 4A and 4B are flowcharts illustrating individual selection and cancel procedures of an embodiment of the present invention.

In FIG. 4A, a flowchart illustrating an individual item selection procedure according to the embodiment of the present invention is shown.

Referring to FIG. 4A, upon receiving an item display command, the portable terminal displays one or more items in a list form at step S405. In the embodiment of the present invention, it is assumed that the items are arranged in a list form, i.e. in a one-dimensional form.

At step S410, the portable terminal determines whether a user's selection input that selects an item among the displayed items is received. When the user's selection input is received, the portable terminal proceeds to step S415 and displays the first region (selection item display region 310) at a portion of the display unit of the portable terminal. The selection item display region 310 is displayed at any one position among the top, bottom, left and right portions of the display unit. In addition, the selection item display region uses a specific focus or is highlighted. At the same time, the portable terminal displays the selected items to be included in the selection item display region 310.

Next, the portable terminal proceeds to step S420 and determines whether the user's selection input that selects another item is received. When the user has selected another item, the portable terminal proceeds to step S425 and determines whether a pre-set number or more of items are displayed in the selection item display region.

When it is determined that the pre-set number or more of items are not displayed, the portable terminal proceeds to step S440 and displays the selection item display region in the state where the selected item is added thereto.

However, when the pre-set number or more of items are displayed, the portable terminal proceeds to step S430 and displays an indicator 320 corresponding to the number of items in the selection item display region 310 or changes the number indicated by the already displayed indicator to reflect the current number of items in the selection item display region 310.

FIG. 4B is a flowchart illustrating a procedure of cancelling a selected item according to the embodiment of the present invention. The procedure of FIG. 4B is executed following the procedure of FIG. 4A.

Referring to FIG. 4B, the portable terminal determines whether a user's selection input that selects the selection item display region 310 is received.

When the user's selection input is received, the portable terminal proceeds to step S455 and displays the second region (the selection item cancel region 330). In the selection item cancel region 330, the items previously selected by the user are displayed. The selection item cancel region 330 is displayed in a pop up form and displays a check box at a side of the selected item to indicate that the corresponding items were previously selected by the user.

Next, at step S460, the portable terminal determines whether the user's selection input that selects an item displayed in the selection item cancel region 330 is received.

When the user's selection input is received, the portable terminal proceeds to step S465 and cancels the selection for the selected items. In such a case, the check mark in the check box displayed at a side of the corresponding items is removed.

Then, the portable terminal proceeds to step S470 and displays the selection item display region 310. The selection item display region 310 is displayed in a state which reflects the items for which the user's selection has been cancelled. That is, the portable terminal changes (updates) the indicator 320 to reflect the number of items which are currently selected after the selection has been cancelled.

FIGS. 5A-5G are views illustrating a method of selecting a plurality of items using a section selection method according to another embodiment of the present invention.

Referring to FIGS. 5A-5G, descriptions will be made on a method of individually selecting a plurality of items according to the present invention.

Figure 5A:
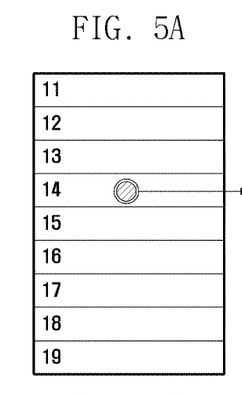
FIGS. 5A-5G are views illustrating a method of selecting a plurality of items using a section selection method according to another embodiment of the present invention.

FIG. 5A illustrated a state where a plurality of items are displayed in a list form. That is, the plurality of items are arranged one-dimensionally in a vertical or horizontal direction. FIG. 5A illustrates an embodiment of the present invention in which the plurality of items are arranged in the vertical direction.

Figure 5B:
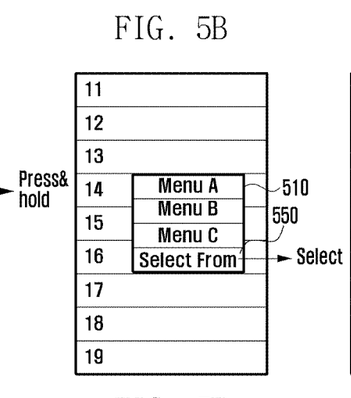

As shown in FIG. 5A, a user's selection input that selects an item (the 14$^{th}$ item as shown in FIG. 5B) is received. As shown in FIG. 5A, the user's selection input is a press and hold (or a long press).

Then, as shown in FIG. 5B, a menu display region 510 is displayed. In the menu display region 510, for example, a menu and a function related to the selected item are displayed. The selected item is executed or a low-order menu is displayed. For example, FIG. 5B shows Menu A, Menu B, Menu C, etc.

In addition, as illustrated in FIG. 5B, a start item setting menu item 550 (a "Select From" menu item) is displayed in the menu display region 510. The start item setting menu item 550 is a menu item for setting a corresponding item as a start item in order to select a plurality of items.

When a specific item (the 14$^{th}$ item) is selected by the user, a section selection mode is activated. In addition, according to an embodiment of the present invention, a focus is applied to the start item so that the start item may be identified as a reference item for selecting the plurality of items.

Figure 5C:
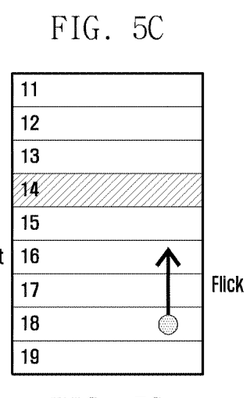

After the 14$^{th}$ item is set as the start item, the screen may be scrolled according to a scroll or flick input, as shown in FIG. 5C.

Figure 5D:
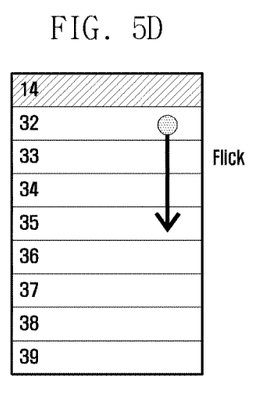
Figure 5E:
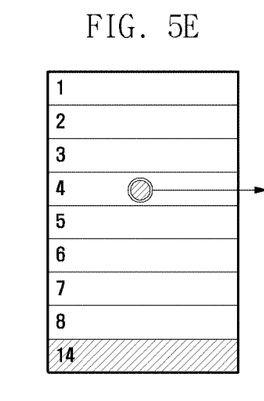

In this case, when the start item leaves the screen according to the flick or scroll as illustrated in FIG. 5D or 5E, the start item be fixed such that it may not be scrolled at the upper end or the lower end according to the flick or scroll direction.

For example, FIGS. 5C and 5D illustrate an embodiment in which the 14$^{th}$ item is scrolled upward after having been set as the start item. In this case, when the 14$^{th}$ item, as the start item, is moved to the uppermost end of the screen, the 14$^{th}$ item is fixed to the uppermost end and then scrolling may be applied only to the remaining items.

In addition, FIGS. 5D and 5E illustrate an embodiment of the present invention in which scrolling is executed downwardly. In this case, when the 14$^{th}$ item as the start item is moved to the lowermost end of the screen, the 14$^{th}$ item is fixed to the lowermost end and then scrolling be applied only to the remaining items.

Then, as shown in FIG. 5E, the user's selection input that selects a specific item (the 4$^{th}$ item) is received. As illustrated in FIG. 5E, the user's selection input in the present embodiment be a press and hold (or a long press).

Figures 5F, 5G:
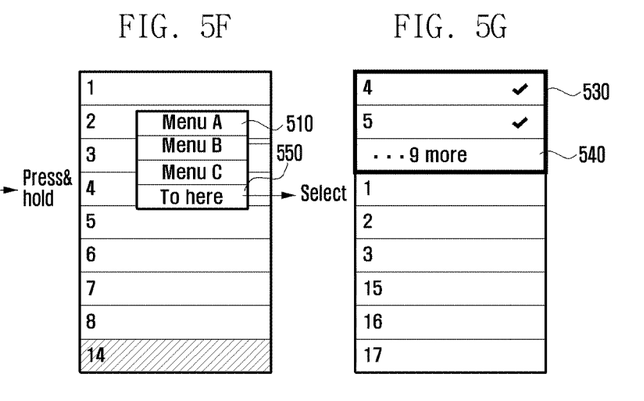

Then, as shown in FIG. 5F, a menu display region 510 is displayed. In the menu display region 510, for example, a menu and a function related to the selected item is displayed. In addition, as illustrated in FIG. 5F, in the menu display region 510, end item setting menu item 560 (a "To here" menu item) is displayed. The end item setting menu item 560 is a menu item for setting a corresponding item as an end item in order to select a plurality of items.

When the start item setting and the end item setting are completed, selection of the plurality of items in sequence from the start item to the end item is completed. In the above-described embodiment of the present invention, 11 items from the 4$^{th}$ item to the 14$^{th}$ item are selected.

Then, as illustrated in FIG. 5G, a selection item display region 530 is displayed at a top of the screen. FIG. 5G shows a state in which the selection item display region 530 is displayed at the upper end of the screen. A focus or highlight may be applied to the selection item display region 530 to indicate that the items are those items selected by the user.

In addition, as shown in FIG. 5G, an indicator 540 be displayed in the selection item display region 530. The indicator 540 corresponds to the number of selected items and is preferably set to indicate a value that is the number of the items selected by the user minus the number of the items currently displayed in the selection item display region 530.

In addition, in an embodiment of the present invention, when the user's input that selects the selection item display region 530 is received, a selection item cancel region may be displayed (not illustrated) so as to cancel the selection for some of the plurality of selected items.

Figure 6:
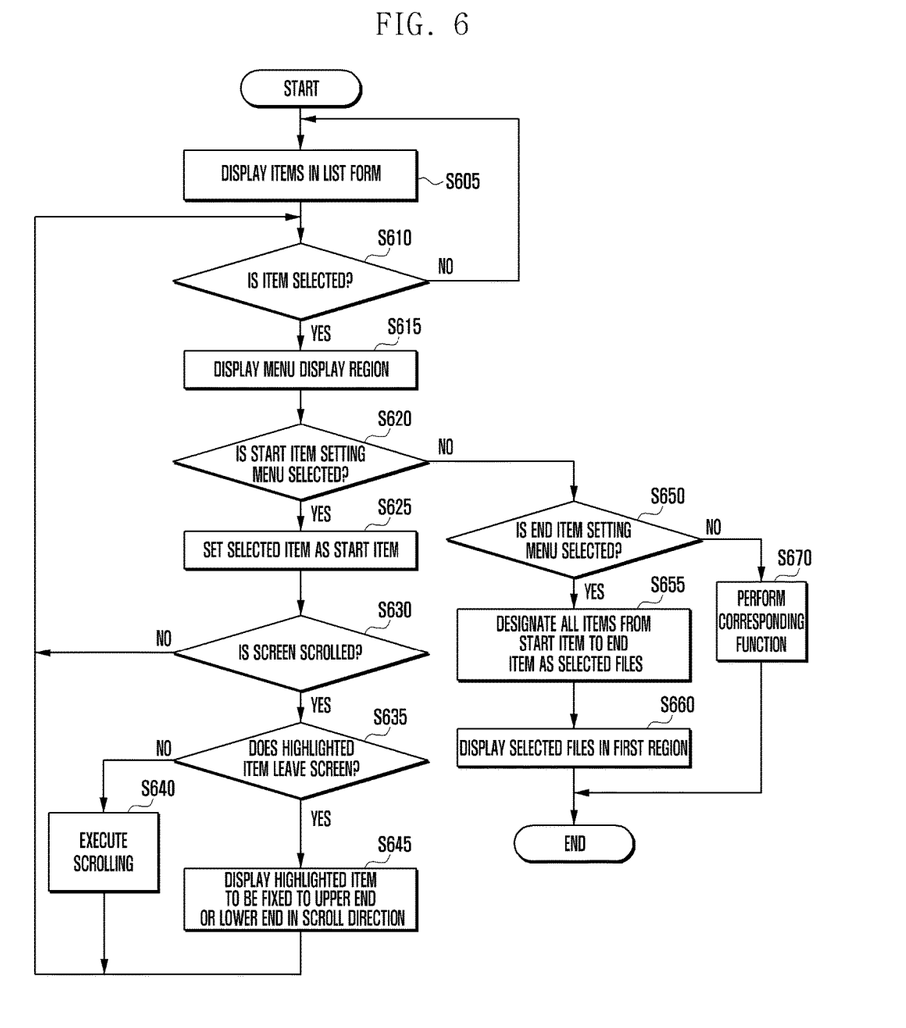
FIG. 6 is a flowchart illustrating a process of selecting a plurality of items using a section selection method according to another embodiment of the present invention.

FIG. 6 is a flowchart illustrating a process of selecting a plurality of items using a section selection method according to another embodiment of the present invention.

Referring to FIG. 6, upon receiving an item display command, the portable terminal displays one or more items in a list form at step S605. In the embodiment of the present invention described herein, it is assumed that the items are arranged in a list form, i.e. in a one-dimension form.

Then, at step S610, the portable terminal determines whether a user's selection input that selects an item among the displayed items is received. In the embodiment of the present invention described herein, it is assumed that the user's selection input is a long press input.

When the user's input is received, the portable terminal proceeds to step S615 and displays a menu display region 510 at a portion of the portable terminal display unit. In the menu display region 510, a menu, for example, for executing the selected item or displaying a low-order menu for the selected item is displayed, and, a start item setting menu item 550 for setting the selected item as the start item is included.

Next, at step S620, the portable terminal determines whether the start item setting menu is selected. When selected, the portable terminal proceeds to step S625 and sets the selected item as the start item for selecting a plurality of items. In this case, the portable terminal applies a highlight to the start item.

Then, the portable terminal proceeds to step S630 and determines whether screen scrolling is executed. When the scrolling is executed, at step S635, the portable terminal determines whether the highlighted item, i.e. the start item, leaves the screen. When the start item does not leave the screen, the portable terminal proceeds to step S640 and continues to execute scrolling. However, when the start item leaves the screen, the portable terminal proceeds to step S645 and displays the start item to be fixed at the upper end or lower end of the display, depending on the scroll direction, such that the start item is not scrolled further.

If the user's selection input for another item is received after the start item is set, then at step S650, the portable terminal determines whether the end item setting menu item 560 is selected. When the end item setting menu item 560 is not selected, the portable terminal proceeds to step S670 and executes a function corresponding to the selected menu.

When the end item setting menu item 560 is selected, the portable terminal proceeds to step S655 and sets all the items sequentially included from the start item to the end item as selected items.

Then, at step S660, the portable terminal displays the selected files in the selection item display region 530. In this case, since the method of cancelling the selection for some items by displaying an indicator 540 in the selection item display region 530 or selecting the selection item display region 530 have been described above, a detailed description thereof will be omitted.

FIGS. 7A-7F and FIGS. 8A-AD illustrate methods of selecting a plurality of items in a state where the items are arranged in a grid form according to another embodiment of the present invention.

Referring to FIGS. 7A-7F, descriptions will be made of a method of selecting a plurality of items in a state where the items are arranged in a grid form.

Figure 7A:
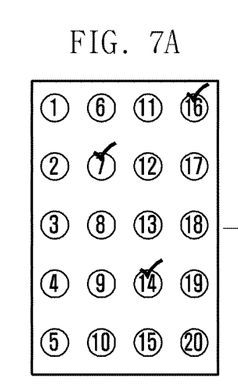
FIGS. 7A-7F are views illustrating a method of selecting a plurality of items in a state where the items are arranged in a grid form according to another embodiment of the present invention.

FIG. 7A illustrates a state where the plurality of items are arranged in a grid form. That is, the plurality of items are arranged two-dimensionally in the horizontal direction and vertical direction in an M*N form. Accordingly, the plurality of items is classified into row components and column components.

As shown in FIG. 7A, a user's selection input that selects some items among the items arranged in the grid form is received. In the embodiment of the present invention described herein, it is assumed that the user's selection input is a touch input.

Then, a selection item display region 710 is displayed at a portion of the display screen. FIG. 7A shows an embodiment of the present invention in which the selection item display region 710 is displayed at the left side of the display screen. In the selection item display region 710, one or more items selected by the user's touch input are displayed.

As described in the previous embodiments of the present invention, the selection item display region 710 uses a specific focus or is highlighted to indicate that a file displayed in the corresponding region is a file selected by the user.

Figure 7B:
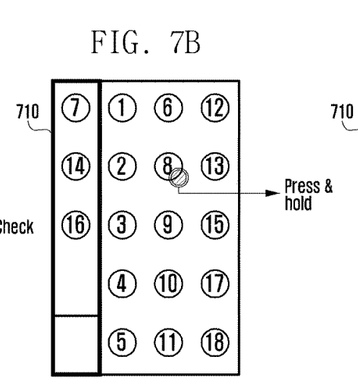
Figure 7C:
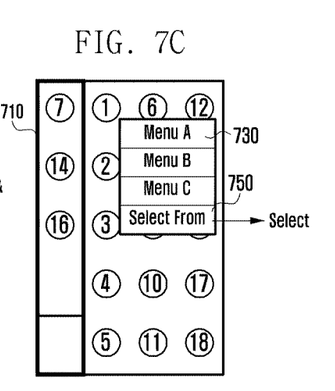

Then, as illustrated in FIG. 7B, the user's selection input (here, it is assumed as a long press) that selects a specific item (the $8^{th}$ item) is received. Then, as illustrated in FIG. 7C, the menu display region 730 is displayed. In the menu display region 730, for example, a menu and a function related to the selected item is displayed. In addition, as shown in FIG. 7C, in the menu display region 730, a start item setting menu item 750 (a "Select From" menu item) is displayed. The start item setting menu item 750 is for setting a corresponding item (the $8^{th}$ item) as a start item for selecting a plurality of items.

When the specific item (the $8^{th}$ item) is set as the start item by the user, a section selection mode is activated. In addition, according to an embodiment of the present invention, a focus is applied to the start item so that the start item be identified as the reference item for selecting the plurality of items.

Figure 7D:
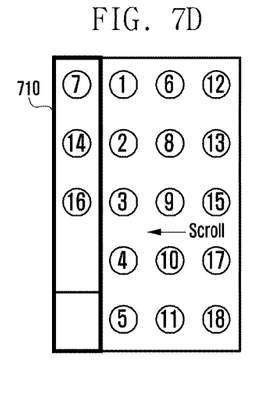
Figure 7E:
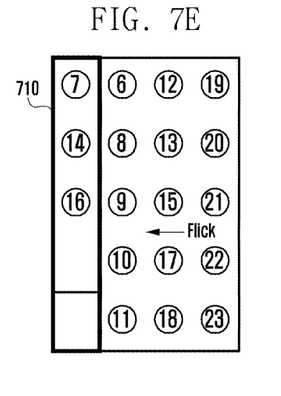

After the $8^{th}$ item is set as the start item, as illustrated in FIGS. 7D and 7E, the screen may be scrolled according to a scroll or flick input.

Figure 7F:
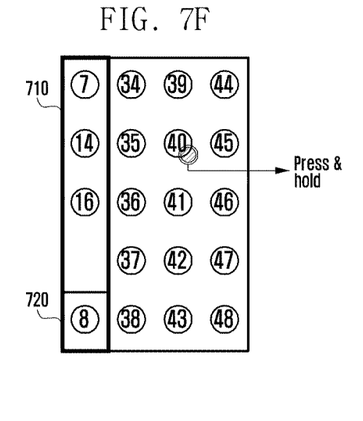

In this case, as shown in FIG. 7F, when the start item leaves the screen according to the flick or scroll, the start item is displayed in the start item display region 720 so that the start item is continuously displayed on the screen. The start item display region 720 is fixed on the screen and is always displayed regardless of the scrolling. In addition, the start item display region 720 is included in the selection item display region 710. FIGS. 7A-7F illustrate an embodiment of the present invention where the start item display region 720 is positioned at the lower end of the selection item display region 710.

Thereafter, as shown in FIG. 7F, a user's selection input that selects a specific item (the $40^{th}$ item) is received. In the embodiment of the present invention described herein, the user's selection input is a press and hold (or a long press).

Figure 8A:
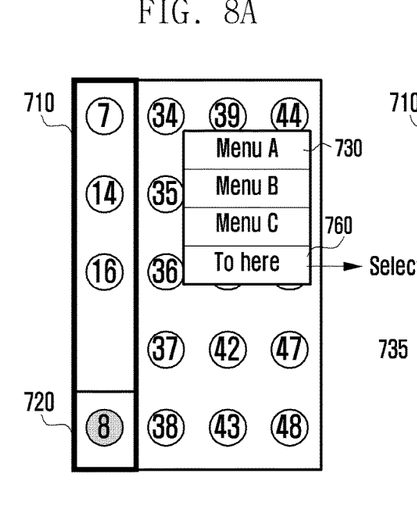
FIGS. 8A-8D are views illustrating a method of selecting a plurality of items in a state where the items are arranged in a grid form according to still another embodiment of the present invention.

Then, as shown in FIGS. 8A-8D, a menu display region 730- is displayed. In the menu display region 730, a menu and a function related to a selected item is displayed. In addition, as shown in FIG. 8A, in the menu display region 730, a end item setting menu item 760 (a "To here" menu item) is displayed. The end item setting menu item 760 is for setting a corresponding item as an end item in order to select a plurality of items.

When the start item setting and the end item setting are completed, selection of a plurality of items in sequence from the start item to the end item is completed. In the example provided herein, 33 items, from the $8^{th}$ item to the $40^{th}$ item, are selected.

Figure 8B:
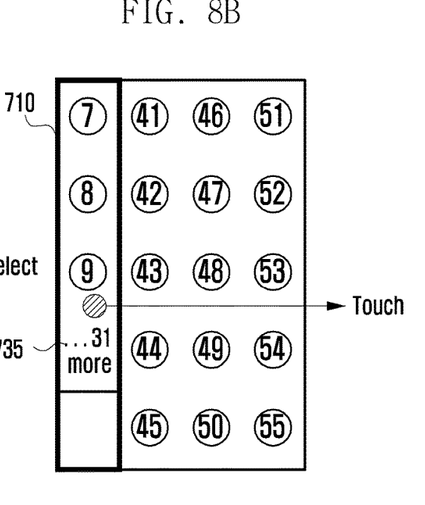

Then, as shown in FIG. 8B, the selected items are displayed in a state where they are included in the selection item display region 710.

In addition, as shown in FIG. 8B, an indicator 735 is displayed in the selection item display region 710. The indicator 735 corresponds to the number of selected items and preferably is set to indicate a value that is the number of items selected items minus the number of items currently displayed in the selection item display region 710.

Figure 8C:
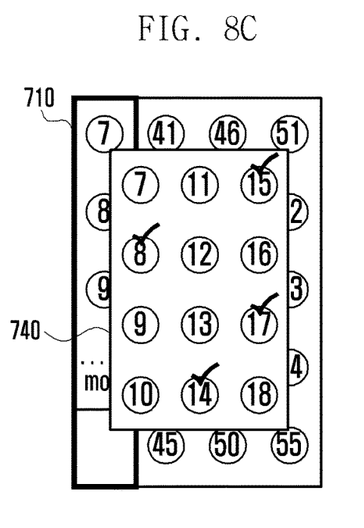

Meanwhile, as illustrated in FIG. 8B, a user's input (preferably, a touch input) that selects the selection item display region 710 is received. Then, the portable terminal displays a selection item cancel region 740, as illustrated in FIG. 8C. In the selection item cancel region 730, a plurality of items selected by the user are displayed.

When the portable terminal receives a user's selection input for an item among the items arranged in the selection item cancel region 730, the corresponding item for which the user's selection input is received is cancelled.

Figure 8D:
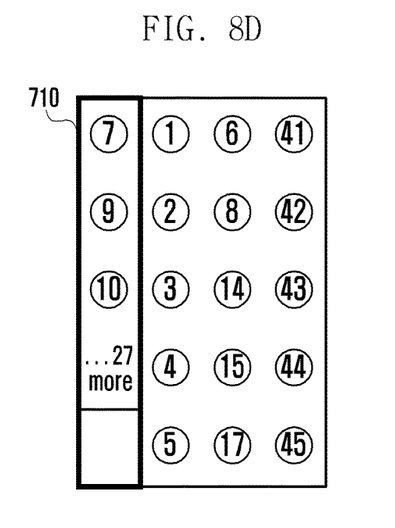

The item for which the selection has been cancelled by the user is removed from the selection item display region 710, as shown in FIG. 8D, and is returned to and displayed at its original position on the original list. Additionally, the indicator 735 be displayed in a state where the number of items for which the selection has been cancelled is reflected.

Figure 9:
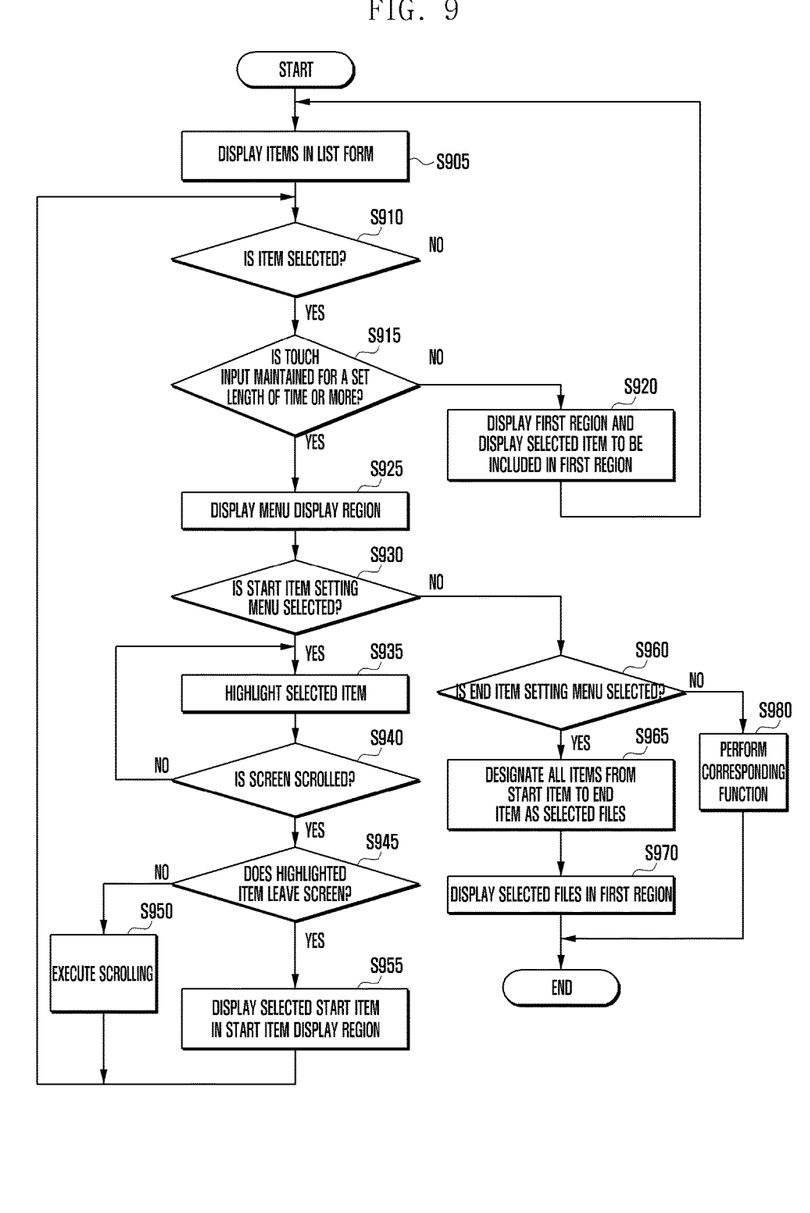
FIG. 9 is a flowchart illustrating a process of selecting a plurality of items in a state where the items are arranged in a grid form according to another embodiment of the present invention.

FIG. 9 is a flowchart illustrating a process of selecting a plurality of items in a state where the items are arranged in a grid form according to another embodiment of the present invention.

Referring to FIG. 9, at step S905, the portable terminal arranges a plurality of items in a grid form. Then, at step S910, the portable terminal determines whether a user's selection input that selects an item is received. In the embodiment of the present invention described herein, it is assumed that the user's selection input is a touch input.

Upon receiving the user's selection input, at step S915 the portable terminal determines whether the touch input is maintained for a set length of time or more. This is a process for determining whether the user's selection input is a touch input or a long press input.

When the touch input is not maintained for the set length of time or more, that is, when the user's selection input is the touch input, the portable terminal proceeds to step S920 and displays the first region (i.e., the selection item display region 710) and displays the selected item in a state where it is included in the selection item display region 710.

However, when the touch input is maintained for the set length of time or more, i.e., when it is determined that the user's selection input is the long press, the portable terminal proceeds to step S925 and displays the menu display region 730.

Then, the portable terminal proceeds to step S930 and determines whether a start item setting menu item 750 is selected among the menu items included in the menu display region 730. When the start item setting menu item 750 is selected, the portable terminal proceeds to step S935 and applies a highlight to the selected item.

Next, the portable terminal proceeds to step 940 and determines whether the screen scrolling is executed. When the screen scrolling is executed, the portable terminal proceeds to step S945 and determines whether the highlighted item, i.e., the start item, leaves the screen.

When the start item does not leave the screen, the portable terminal proceeds to step S950 and executes the scrolling.

When the start item leaves the screen, the portable terminal proceeds to step S955 and displays the start item in the start item display region 720. Since the start item display region 720 is fixed on the display screen regardless of the scrolling, the user may always confirm the start item even if the position of the start item leaves the screen due to the scrolling. Finally, the portable terminal returns to step S910 to wait for a user's input selection.

After the start item has been set initially, if the end item setting menu item 760 is later set through the menu display region 730 at step S960, then at step S965, the portable terminal sets (designates) all the items from the start item to the end item as the selected items. Then, at step S970, the portable terminal displays the plurality of selected items in the selection item display region 710.

Additionally, at step S960, when a selection input that does not select the end item setting menu item 760, the portable terminal proceeds to step S980 and performs the corresponding function (e.g., execution of the selected item).

Meanwhile, since the process of cancelling some of the plurality of selected item has been described above, the detailed description thereof will be omitted.

According to the embodiments of the present invention as described above, when selecting a plurality of files, the user may select or cancel the files rapidly and efficiently.

The embodiments of the present invention disclosed in the specification and drawings are presented merely to easily describe the technical contents of the present invention and help the understanding of the present invention, but are not intended to limit the scope of the present invention. It will be obvious to a person ordinarily skilled in the art that, besides the embodiments disclosed herein, other modified embodiments based on the technical idea of the present invention be made.

What is claimed is:

1. A method of selecting an item of a portable terminal, the method comprising:
  displaying a plurality of items in an arrangement according to a prescribed rule on a display screen of the portable terminal;
  receiving a selection input that selects at least one item among the plurality of items;
  receiving a start item setting input that sets a first item as a start item;
  when the start item leaves the display screen by user operation until receiving an end item setting input after receiving the start item setting input, displaying the start item to be fixed in a region of the display screen;
  receiving the end item setting input that sets a second item as an end item;
  setting items selected between the first item, the second item and the at least one item, as selected items;
  displaying a first item display region including a set number of items from among the selected items and an indicator, wherein the indicator is set to indicate a value that is the number of selected items minus the number of items currently displayed in the first item display region;
  displaying a second item display region including not-selected items; and
  if a selection input for the first item display region is received, displaying the selected items,
  wherein the first item display region is displayed to be fixed regardless of the end item setting input, if the number of the selected items is larger than the set number of items, and
  wherein the second item display region and the value associated with the indicator are displayed to be changed according to the end item setting input.

2. The method of claim 1, further comprising:
  when the selection input for the first item display region is received, displaying a selection item cancel region that includes the selected items; and
  when a selection input for an item among the selected items displayed in the selection item cancel region is received, canceling the item for which the selection input is received.

3. The method of claim 1, further comprising:
  executing scrolling when a scroll command is received after receiving the start item setting input;
  determining whether the start item leaves the display screen of the portable terminal when the scrolling is executed; and
  when the start item leaves the display screen, displaying the start item to be fixed in the region of the display screen according to a direction of the scrolling.

4. The method of claim 3, wherein displaying the plurality of items in the arrangement according to the prescribed rule comprises:
  when the plurality of items are arranged in a grid form, determining whether the start item leaves the display screen of the portable terminal when the scrolling is executed; and
  when the start item leaves the display screen, displaying the start item in the first item display region.

5. The method of claim 1, wherein displaying the plurality of items in the arrangement according to the prescribed rule comprises displaying the plurality of items in a one-dimensional form that includes a vertical direction or a horizontal direction.

6. The method of claim 1, wherein displaying the plurality of items in the arrangement according to the prescribed rule comprises displaying the plurality of items in a two-dimensional form arrangement that includes a row component and a column component.

7. A portable terminal for selecting an item, the portable terminal comprising:
a memory;
at least one processor coupled to the memory;
a display, executable by the at least one processor, configured to display one or more items on a display screen of the portable terminal; and
an item selection control unit, executable by the at least one processor, configured to:
arrange a plurality of items for display according to a prescribed rule,
receive a selection input that selects at least one item among the plurality of items,
receive a start item setting input that sets a first item as a start item,
display the start item to be fixed in a region of the display screen when the start item leaves the display screen by user operation until receiving an end item setting input after receiving the start item setting input,
receive the end item setting input that sets a second item as an end item,
set items selected between the first item, the second item and the at least one item as selected items,
display a first item display region including a set number of items from among the selected items and an indicator, wherein the indicator is set to indicate a value that is the number of selected items minus the number of items currently displayed in the first item display region,
display a second item display region including not-selected items, and
display the selected items if a selection input for the first item display region is received,
wherein the first item display region is displayed to be fixed regardless of the end item setting input, if the number of the selected items is larger than the set number of items, and
wherein the second item display region and the value associated with the indicator are displayed to be changed according to the end item setting point.

8. The portable terminal of claim 7, wherein the item selection control unit is further configured to:
control to display a selection item cancel region that includes the selected items, when the selection input for the first item display region is received, and
control to cancel the item for which the selection input is received when a selection input for an item among the selected items displayed in the selection item cancel region is received.

9. The portable terminal of claim 7, wherein the item selection control unit is further configured to:
execute scrolling when a scroll command is received after receiving the start item setting input,
determine whether the start item leaves the display screen of the portable terminal when the scrolling is executed, and
when the start item leaves the display screen, control to display the start item to be fixed in the region of the display screen according to a direction of the scrolling.

10. The portable terminal of claim 9, wherein, when the plurality of items are arranged in a grid from, the item selection control unit is further configured to:
determine whether the start item leaves the display screen of the portable terminal when the scrolling is executed, and
when the start item leaves the display screen, display the start item in the first item display region.

11. The portable terminal of claim 7, wherein the item selection control unit is further configured to control to display the plurality of items in a one-dimensional form that includes a vertical direction or a horizontal direction.

12. The portable terminal of claim 7, wherein the item selection control unit is further configured to control to display the plurality of items in a two-dimensional form that includes a row component and a column component.

* * * * *